United States Patent
Chang et al.

(10) Patent No.: US 9,374,416 B2
(45) Date of Patent: *Jun. 21, 2016

(54) UNIVERSAL ARCHITECTURE FOR CLIENT MANAGEMENT EXTENSIONS ON MONITORING, CONTROL, AND CONFIGURATION

(71) Applicant: International Business Machines Corporation, Armonk, NY (US)

(72) Inventors: David W. Chang, San Jose, CA (US); Bilung Lee, San Jose, CA (US); Paul A. Ostler, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/281,290

(22) Filed: May 19, 2014

(65) Prior Publication Data

US 2014/0258364 A1    Sep. 11, 2014

Related U.S. Application Data

(63) Continuation of application No. 12/605,205, filed on Oct. 23, 2009, now Pat. No. 8,775,498.

(51) Int. Cl.
*H04L 29/08* (2006.01)
*G06F 9/50* (2006.01)

(52) U.S. Cl.
CPC .............. *H04L 67/10* (2013.01); *G06F 9/5027* (2013.01); *G06F 2209/508* (2013.01); *G06F 2209/5011* (2013.01)

(58) Field of Classification Search
None
See application file for complete search history.

(56) References Cited

U.S. PATENT DOCUMENTS

| | | |
|---|---|---|
| 5,915,112 A | 6/1999 | Boutcher |
| 6,418,447 B1 | 7/2002 | Frey et al. |
| 6,442,564 B1 | 8/2002 | Frey et al. |
| 6,502,103 B1 | 12/2002 | Frey et al. |
| 6,505,210 B1 | 1/2003 | Frey et al. |
| 6,553,384 B1 | 4/2003 | Frey et al. |
| 6,560,609 B1 | 5/2003 | Frey et al. |
| 6,567,818 B1 | 5/2003 | Frey et al. |
| 6,594,671 B1 | 7/2003 | Aman et al. |
| 7,099,931 B2 | 8/2006 | Da Palma et al. |

(Continued)

OTHER PUBLICATIONS

Denise, J.F. and Fuchs, D., "Java(TM) Management Extensions (JMX(TM)) Interoperation with Non Java Technologies", Sun Microsystems 2008, 19 pp.

(Continued)

*Primary Examiner* — Ranodhi Serrao
(74) *Attorney, Agent, or Firm* — Janaki K. Davda; Konrad, Raynes, Davda & Victor LLP

(57) ABSTRACT

Provided are techniques for, under control of an agent: receiving a request from a first database client to access a service from a set of services, wherein the agent is associated with the service; receiving a request from a second database client to access the service, wherein the agent is shared by the first database client and the second database client; combining information from the first database client and the second database client; and sending the combined information to the service using a single physical connection in a client-side Client Management Extension (CMX) connection, wherein the first database client and the second database client share the single physical connection.

25 Claims, 14 Drawing Sheets

(56) References Cited

U.S. PATENT DOCUMENTS

| | | | |
|---|---|---|---|
| 7,318,089 | B1 | 1/2008 | Stachura et al. |
| 7,376,730 | B2 | 5/2008 | Pandya |
| 7,509,330 | B2 | 3/2009 | Ewing et al. |
| 7,509,413 | B2 | 3/2009 | Daniel et al. |
| 7,953,703 | B2 | 5/2011 | Aggarwal et al. |
| 8,082,553 | B2 | 12/2011 | McArdle |
| 8,566,387 | B2 | 10/2013 | Chang et al. |
| 2002/0129096 | A1 | 9/2002 | Mansour et al. |
| 2003/0177182 | A1 | 9/2003 | Clark et al. |
| 2004/0019898 | A1 | 1/2004 | Frey et al. |
| 2004/0221059 | A1 | 11/2004 | Bush |
| 2005/0262183 | A1 | 11/2005 | Colrain et al. |
| 2006/0041662 | A1 | 2/2006 | Georgiev et al. |
| 2006/0067209 | A1 | 3/2006 | Sheehan et al. |
| 2006/0136490 | A1 | 6/2006 | Aggarwal et al. |
| 2006/0167999 | A1 | 7/2006 | Clark et al. |
| 2006/0190775 | A1 | 8/2006 | Aggarwal et al. |
| 2007/0294704 | A1 | 12/2007 | Stephen et al. |
| 2008/0091978 | A1 | 4/2008 | Brodsky et al. |
| 2008/0151767 | A1 | 6/2008 | Moran et al. |
| 2008/0184234 | A1 | 7/2008 | Vutharkar et al. |
| 2008/0215729 | A1 | 9/2008 | Diao et al. |
| 2008/0320034 | A1 | 12/2008 | McArdle |
| 2009/0037544 | A1 | 2/2009 | Wang et al. |
| 2011/0099219 | A1 | 4/2011 | Chang et al. |
| 2011/0214009 | A1 | 9/2011 | Aggarwal et al. |
| 2011/0214010 | A1 | 9/2011 | Aggarwal et al. |

OTHER PUBLICATIONS

Final Office Action 1, Jan. 23, 2013, for U.S. Appl. No. 12/605,205, filed Oct. 23, 2009 by D.W. Chang et al., Total 16 pp. [57.181 (FOA1)].

Final Office Action 1, Jan. 23, 2013, for U.S. Appl. No. 13/450,251, filed Apr. 18, 2012 by D.W. Chang et al., Total 10 pp. [57.181C1 (FOA1)].

Final Office Action 2, Dec. 30, 2013, for U.S. Appl. No. 12/605,205, filed Oct. 23, 2009 by D.W. Chang et al., Total 9 pp. [57.181 (FOA2)].

International Search Report & Written Opinion, Nov. 18, 2010, for International Application No. PCT/EP2010/062498, Total 10 pp.

Notice of Allowance, Feb. 24, 2014, for U.S. Appl. No. 12/605,205, filed Oct. 23, 2009 by D.W. Chang et al., Total 9 pp. [57.181 (NOA)].

Notice of Allowance, Jun. 10, 2013, for U.S. Appl. No. 13/450,251, filed Apr. 18, 2012 by D.W. Chang et al., Total 8 pp. [57.181C1 (NOA)].

Office Action 1, Aug. 21, 2012, for U.S. Appl. No. 12/605,205, filed on Oct. 23, 2009 by D.W. Chang et al., Total 21 pp. [57.181 (OA1)].

Office Action 1, Aug. 21, 2012, for U.S. Appl. No. 13/450,251, filed Apr. 18, 2012 by D.W. Chang et al., Total 15 pp. [57.181C1 (OA1)].

Office Action 3, Aug. 23, 2013, for U.S. Appl. No. 12/605,205, filed Oct. 23, 2009 by D.W. Chang et al., Total 15 pp. [57.181 (OA3)].

Preliminary Amendment, Apr. 18, 2012, for U.S. Appl. No. 12/605,205, filed Oct. 23, 2009 by D.W. Chang et al., Total 8 pp. [57.181 (PrelimAmend)].

Preliminary Remarks, Apr. 18, 2012, for U.S. Appl. No. 13/450,251, filed Apr. 18, 2012 by D.W. Chang et al., Total 2 pp. [57.181C1 (PrelimRemarks)].

Response to Final Office Action 1, Apr. 23, 2013, for U.S. Appl. No. 12/605,205, filed Oct. 23, 2009 by D.W. Chang et al., Total 9 pp. [57.181 (RFOA1)].

Response to Final Office Action 1, Apr. 23, 2013, for U.S. Appl. No. 13/450,251, filed Apr. 18, 2012 by D.W. Chang et al., Total 5 pp. [57.181C1 (RFOA1)].

Response to Final Office Action 2, Feb. 13, 2014, for U.S. Appl. No. 12/605,205, filed Oct. 23, 2009 by D.W. Chang et al., Total 6 pp. [57.181 (RFOA2)].

Response to Office Action 1, Nov. 29, 2012, for U.S. Appl. No. 12/605,205, filed Oct. 23, 2009 by D.W. Chang et al., Total 11 pp. [57.181 (ROA1)].

Response to Office Action 1, Nov. 29, 2012, for U.S. Appl. No. 13/450,251, filed Apr. 18, 2012 by D.W. Chang et al., Total 5 pp. [57.181C1 (ROA1)].

Response to Office Action 3, Nov. 20, 2013, for U.S. Appl. No. 12/605,205, filed Oct. 23, 2009 by D. W. Chang et al., Total 8 pp. [57.181 (ROA3)].

Shin, S., "Using the Java(TM) Management Extensions (JMX(TM)) API for Monitoring and Management", Sun Microsystems, Available on Oct. 23, 2009 on the Internet at <http: www.javapassion.com/j2se/JMXOverview.pdf>, 44 pp.

US 9,374,416 B2

UNIVERSAL ARCHITECTURE FOR CLIENT MANAGEMENT EXTENSIONS ON MONITORING, CONTROL, AND CONFIGURATION

CROSS-REFERENCE TO RELATED APPLICATIONS

This application is a continuation of and claims the benefit of U.S. patent application Ser. No. 12/605,205, filed Oct. 23, 2009, which application is incorporated herein by reference in its entirety.

BACKGROUND

1. Field

Embodiments of the invention relate to a universal architecture for client management extensions on monitoring, control, and configuration.

2. Description of the Related Art

Databases are computerized information storage and retrieval systems. Relational databases are organized into tables that consist of rows and columns of data. The rows may be called tuples or records or rows. A database typically has many tables, and each table typically has multiple rows and multiple columns. A query (e.g., a SQL statement) may be described as a request for information from a database based on specific conditions.

Modern database tools are emerging these days to facilitate database administrators to monitor, control, and configure complicated and distributed database environments more efficiently and effectively. Database environments typically include at least one client computer, at least one database server computer, and at least one database. Due to the distinct nature of different management functionalities (e.g., monitoring, control, and configuration), those database tools are mostly built on top of a wide variety of architectures, and each of the database tools is equipped with a separate channel and protocol for communication among respective components in the database environments. Consequently, overall performance of those database environments can be negatively impacted under the operations of a number of database tools that all function independently with their own channels and protocols within the database environments.

Moreover, individual, distinct architecture used by each additional database tool imposes additional development, deployment, and maintenance effort for the database administrators. The architecture may be described as how each database tool may be implemented. However, due to increasing complexity and heterogeneity, it is far from a trivial task to resolve such difficult points in modern database environments. Hierarchically, various database clients can operate on top of one another as a sequence of call stack layers, where, for example, an application server (i.e., the client computer may be the application server running applications) can invoke a persistence layer which can in turn call into a database driver. Thus, a call stack may be said to describe the layers that are in use when an application is running A persistence layer may be described as mapping runtime objects (e.g., tables and objects). A database driver may be described as enabling communication between a client computer and a database server computer. Concurrently, multiple database tools can also function in parallel independently. Thus, there is a need for accommodating hierarchical (i.e., with reference to the call stack) and concurrent management functionalities leveraged by the database environments.

BRIEF SUMMARY

Provided are a method, computer program product, and system for, under control of an: receiving a request from a first database client to access a service from a set of services, wherein the agent is associated with the service; receiving a request from a second database client to access the service, wherein the agent is shared by the first database client and the second database client; combining information from the first database client and the second database client; and sending the combined information to the service using a single physical connection in a client-side Client Management Extension (CMX) connection, wherein the first database client and the second database client share the single physical connection.

BRIEF DESCRIPTION OF THE SEVERAL VIEWS OF THE DRAWINGS

Referring now to the drawings in which like reference numbers represent corresponding parts throughout:

FIG. 4 is formed by FIGS. 4A, 4B, 4C, 4D, 4E, and 4F.

FIG. 5 is formed by FIGS. 5A, 5B, 5C, and 5D.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
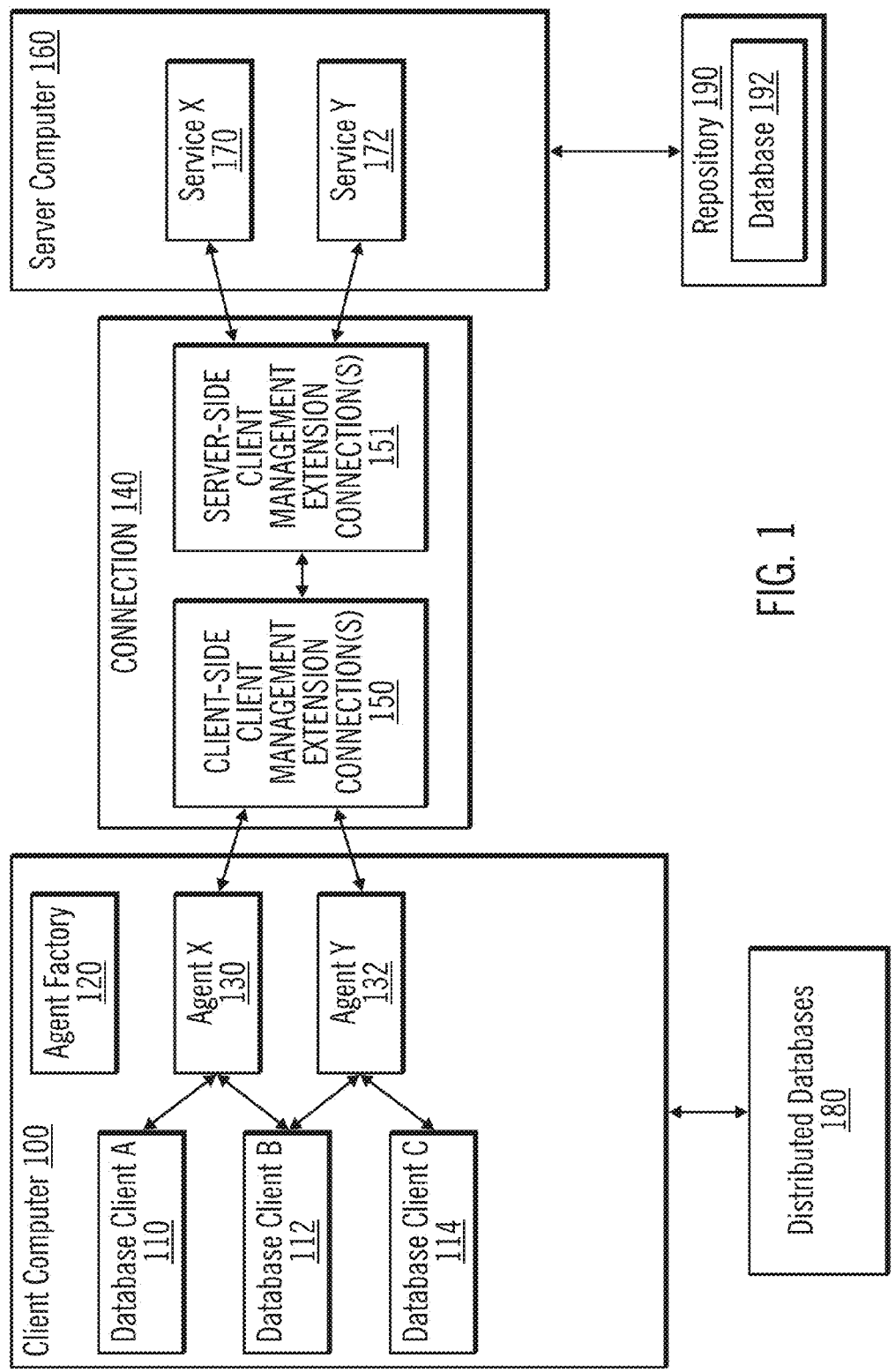
FIG. 1 illustrates, in a block diagram, a computing architecture in accordance with certain embodiments of the invention.

FIG. 1 illustrates, in a block diagram, a computing architecture in accordance with certain embodiments of the invention. A client computer 100 is coupled to a server computer 160. The server computer 160 is coupled to a repository 190 storing a database 192. The server computer 160 provides the client computer 100 with access to a database 192. The client computer 100 is coupled to distributed databases 180, and each database client 110, 112, 114 can access any of the distributed databases 180. A database client 110, 112, 114 may be an application server, persistence layer, a database driver, or a database utility. A distributed database may be described as multiple database servers spread across a network of computers.

The client computer 100 includes multiple database clients shown in FIG. 1 as database client A 110, database client B 112, and database client C 114. Although three database clients 110, 112, 114 are shown, any number of database clients may be running at client computer 100 in various embodiments. In certain embodiments, the database clients 110, 112, 114 may be described as complicated enterprise applications.

The client computer 100 also includes an agent factory 120 and multiple agents shown in FIG. 1 as agent X 130 and agent Y 132. The agent factory 120 generates agents 130, 132. Although two agents 130, 132 are shown, there may be any number of agents running at client computer 100 in various embodiments.

The server computer 160 includes multiple services shown in FIG. 1 as service X 170 and service Y 172. Although two services 170, 172 are shown, there may be any number of services running at server computer 160 in various embodiments.

On the server computer 160 various services (such as services 170, 172) are provided to perform a variety of management functionalities (e.g., monitoring, control, and configuration). For example, a monitoring service allows performance and health monitoring of live systems, a control service enables remote administration of overall environment, and a configuration service allows real time property configuration of live systems. A matching agent (such as agent 130 and agent 132) is also provided for each of the services that provide management functionality. In FIG. 1, agent X 130 is provided for service X 170, and agent Y 132 is provided for service Y 172. The agent 130, 132 communicates with the corresponding service 170, 172 on behalf of one or more database clients 110, 112, 114 to perform certain management functionality on the server computer 160.

A connection 140 between the client computer 100 and the server computer 160 may be said to be formed by Client Management Extension (CMX) connections 150, 151. Also, a physical connection resides underneath CMX connections 150, 151. CMX connections 150, 151 are used to route data between the client computer 100 and the server computer 160. In particular, there is a client-side CMX connection 150 coupled to a server-side CMX connection 151.

As shown in FIG. 1, the infrastructure may be described as consisting of three types of components: the client components, the agent components, and the service components. The infrastructure supports heterogeneous clients, which can be, for example, application servers, persistence layers, database drivers, and database utilities. The application servers, persistence layers, database drivers, and database utilities may be described as client runtimes.

In FIG. 1, multiple services 170, 172 are running on the same server computer 160. However, in various embodiments, the services 170, 172 can run on more than one server computer under the provided infrastructure. In addition, multiple services 170, 172 may share a common repository 190, which is responsible for persistent storage.

In FIG. 1, the repository 190 stores the database 192 and may comprise an array of storage devices, such as Direct Access Storage Devices (DASDs), Just a Bunch of Disks (JBOD), Redundant Array of Independent Disks (RAID), virtualization device, etc.

Embodiments provide a universal architecture for client management extensions (150, 151) that facilitate monitoring, control, and configuration of database environments (such as the one shown in FIG. 1) with distributed databases 180 and database clients 110, 112, 114. The universal architecture is equipped with a polymorphic infrastructure that can be leveraged to build a variety of specific management functionalities. A polymorphic infrastructure describes the ability to define many independent services (e.g., 170, 172) running on one server computer 160 that share a physical connection (e.g., formed by 150, 151) to the client computer 100).

Moreover, a generic protocol is provided in the architecture to enable communication of distinct management information (i.e., data) on top of the same infrastructure. The generic protocol is used for multiple management functionalities. That is, the generic protocol is not specific to any management functionality. The generic protocol supports not only synchronous but also asynchronous messaging mechanisms. This can provide great performance benefit because some management functionality may work best with a request/response paradigm while others may seek to minimize performance cost with non-blocking messaging.

Furthermore, the call stack for concurrent database clients is optimized such that the call stack allows multiple database clients to share a same physical connection. Embodiments accumulate and combine distinct management information (i.e., data) from hierarchical database clients to provide a complete picture on the overall system and to optimize the network flows.

Figure 2:
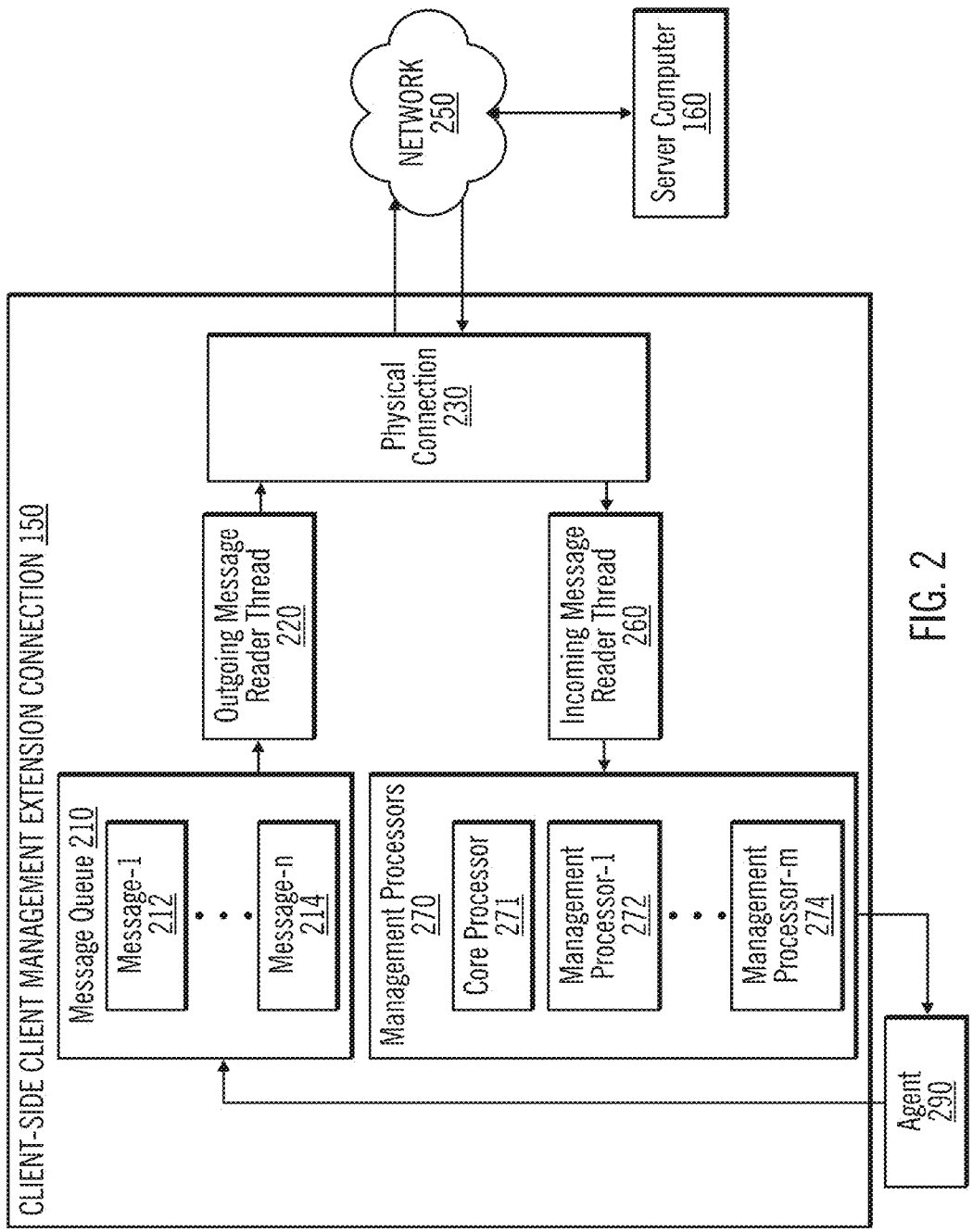
FIG. 2 illustrates, in a block diagram, further details of a client-side CMX connection in accordance with certain embodiments.

FIG. 2 illustrates, in a block diagram, further details of a client-side CMX connection 150 in accordance with certain embodiments. In FIG. 2, the client-side CMX connection 150 includes a client-side message queue 210, client-side outgoing message reader thread 220, physical connection 230, client-side incoming message reader thread 260, and client-side management processors 270. Agent 290 may represent, for example, agent X 130 or agent Y 132 in FIG. 1. The physical connection 230 may be described as a physical socket.

The client-side message queue 210 includes client-side message-1 212 through client-side message-n 214. The ellipses and the use of the suffixes "1" and "n" indicate that there may be any number of client-side messages in the client-side message queue 210 in various embodiments. For example, a message may be used by an agent 290 to report statistics (e.g., about a database driver) to a service 170, 172. Another example of a message is one that requests configuration settings from a service 170, 172.

The client-side management processors 270 include client-side core processor 271 and client-side management processor-1 272 through client-side management processor-m. The ellipses and the use of the suffixes "1" and "m" indicate that there may be any number of client-side management processors in various embodiments.

The client-side message queue 210 receives an outgoing message from an agent 290. The outgoing message is stored in the client-side message queue 210 until the outgoing message is sent to the client-side outgoing message reader thread 220. The client-side outgoing message reader thread 220 sends the outgoing message to the physical connection 230. The physical connection 230 is coupled to network 250. The network 250 is coupled to the server computer 160. The physical connection 230 sends the outgoing message through the network 250 to the server computer 160, and the server computer 160 processes the message and returns an incoming message through the network 250 to the physical connection 230.

The physical connection 230 receives an incoming message from the network 250 and forwards the incoming message to the client-side incoming message reader thread 260. The client-side incoming message reader thread 260 sends the incoming message to the client-side management processors 270. The incoming message is processed by one of the client-side management processors 272 . . . 274. Each client-side management processor 272 . . . 274 has a name and a version. In certain embodiments, a management functionality is associated with a particular client-side management processor 272 ... 274, and messages associated with a particular management functionality are routed to the associated client-side management processor 272 ... 274. The client-side management processor 272 ... 274 forwards the input message to agent 290. Although one agent 290 is shown, any number of agents may be coupled to the CMX connection 150, and, then the client-side management processor 272 ... 274 forwards the input message to the appropriate agent (e.g., the agent that sent a message requesting data from a service 170, 172).

Furthermore, beneath the agents (such as agent X 130 and agent Y 132) there may be multiple CMX connections, and each of the CMX connections is equipped with a message queuing architecture for the messages, as shown in FIG. 2.

When the agent 290 provides messages to the CMX connection 150, there is no processing done by the agent 290 for the thread running on the agent 290 to send the message. With embodiments, the work of sending the messages is offloaded to the CMX connection 150 outgoing message reader thread 220. The outgoing message reader thread 220 is responsible for processing the message queue 210 and writing to the physical connection 230 such that communication has minimal impact to the client computer 100. Similarly, the incoming message reader thread 260 processes incoming messages over the physical connection 230. This allows asynchronous messages to be received and processed independent of the existing database client 110, 112, 114 threads.

Figure 3:
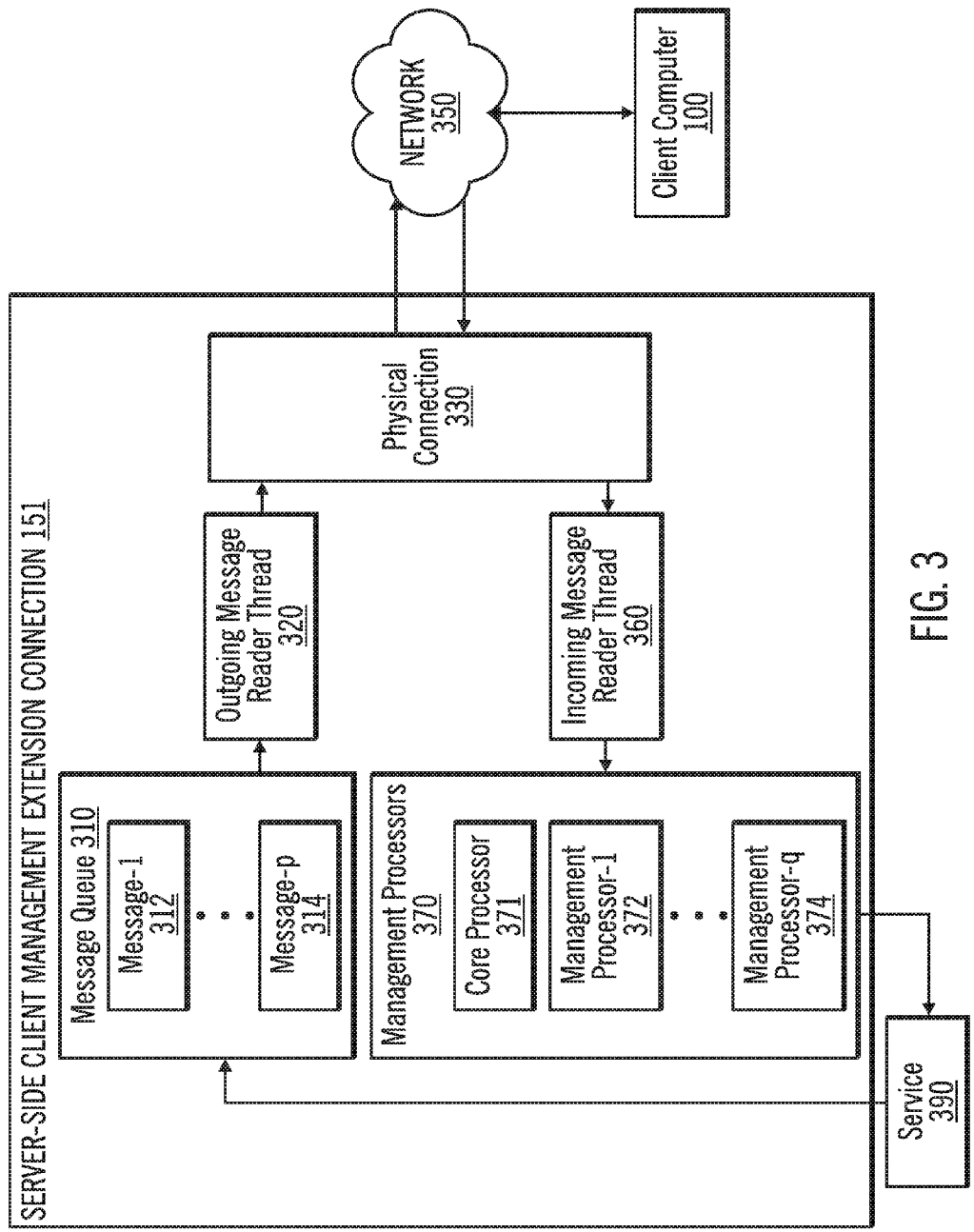
FIG. 3 illustrates, in a block diagram, further details of a server-side CMX connection in accordance with certain embodiments.

FIG. 3 illustrates, in a block diagram, further details of a server-side CMX connection 151 in accordance with certain embodiments. In FIG. 3, the server-side CMX connection 151 includes a server-side message queue 310, server-side outgoing message reader thread 320, physical connection 330, server-side incoming message reader thread 360, and server-side management processors 370. Service 390 may represent, for example, service X 170 or service Y 172 in FIG. 1. The physical connection 330 may be described as a physical socket.

The server-side message queue 310 includes server-side message-1 312 through server-side message-n 314. The ellipses and the use of the suffixes "1" and "p" indicate that there may be any number of messages in the server-side message queue 310 in various embodiments. For example, a message may be used by a service 390 to report statistics (e.g., about a database driver) to an agent 130, 132. Another example of a message is one that provides configuration settings to an agent 130, 132.

The server-side management processors 370 include server-side core processor 371 and server-side management processor-1 372 through server-side management processor-m. The ellipses and the use of the suffixes "1" and "q" indicate that there may be any number of management processors in various embodiments.

The server-side message queue 310 receives an outgoing message from a service 390. The outgoing message is stored in the server-side message queue 310 until the outgoing message is sent to the server-side outgoing message reader thread 320. The server-side outgoing message reader thread 320 sends the outgoing message to the physical connection 330. The physical connection 330 is coupled to network 350. The network 350 is coupled to the client computer 100. The physical connection 330 sends the outgoing message through the network 350 to the client computer 100, and the client computer 100 processes the message and returns an incoming message through the network 350 to the physical connection 330.

The physical connection 330 receives an incoming message from the network 350 and forwards the incoming message to the server-side incoming message reader thread 360. The server-side incoming message reader thread 360 sends the incoming message to the server-side management processors 370. The incoming message is processed by one of the server-side management processors 372 ... 374. Each server-side management processor 372 ... 374 has a name and a version. In certain embodiments, each management functionality is associated with a particular server-side management processor 372 ... 374, and messages associated with a particular management functionality are routed to the associated server-side management processor 372 ... 374. The server-side management processor 372 ... 374 forwards the input message to service 390. Although one service 390 is shown, any number of services may be coupled to the CMX connection 151, and, then the server-side management processor 372 ... 374 forwards the input message to the appropriate service (e.g., the service that is to process a message from a particular agent 130, 132).

Furthermore, beneath the services (such as service X 170 and service Y 172) there may be multiple CMX connections, and each of the CMX connections is equipped with a message queuing architecture for the messages, as shown in FIG. 3.

When the service 390 provides messages to the CMX connection 151, there is no processing done by the service 390 for the thread running on the service 390 to send the message. With embodiments, the work of sending the messages is offloaded to the CMX connection 151 outgoing message reader thread 320. The outgoing message reader thread 320 is responsible for processing the message queue 310 and writing to the physical connection 330 such that communication has minimal impact to the server computer 160. Similarly, the incoming message reader thread 360 processes incoming messages over the physical connection 330. This allows asynchronous messages to be received and processed independent of the existing database client 110, 112, 114 threads.

In certain embodiments, multiple agents 130, 132 use one client-side CMX connection 150 once the client-side CMX connection 150 has been established. In certain embodiments, multiple services 170, 172 use one client-side CMX connection 151 once the server-side CMX connection 151 has been established.

In certain embodiments, each agent 130, 132 accumulates and combines information from multiple database clients 110, 112, 114.

In certain embodiments, at least one agent 130, 132 accumulates and combines information from multiple agents 130, 132. In such embodiments, a message queue may be included in the agent 130, 132 performing the accumulation.

In certain embodiments, at least one service 170, 172 accumulates and combines information from multiple services 170, 172. In such embodiments, a message queue may be included in the service 170, 172 performing the accumulation.

In certain embodiments, the message queue 210 accumulates and combines information from multiple agents 130, 132. In certain embodiments, the message queue 310 accumulates and combines information from multiple services 170, 172.

In certain embodiments, the physical connection 230, 330 accumulates and combines information from multiple CMX connections. In such embodiments, a message queue may be included in the physical connection 230, 330 performing the accumulation.

Embodiments employ a generic protocol for the agents and the processors to communicate in an efficient, optimized, and flexible way to accommodate various management functionalities. The following are aspects of the generic protocol:

1. The generic protocol provides on-the-wire transport type flexibility. The generic protocol enables data to be at byte level, while data formats, such as JavaScript® Object Notation (JSON) or Extensible Markup Language (XML), can be easily plugged in (JAVA is a trademark of Sun Microsystems in the United States, other countries, or both).
2. The underlying messaging mechanism can be either synchronous or asynchronous. This is useful because some management functionality may work best with a request/response paradigm whereas other management functionality, such as monitoring functionality, may seek to minimize performance cost with asynchronous messaging. The configuration functionality can also exploit asynchronous messaging due to the asynchronous nature of dynamic reconfiguration. The configuration functionality may be used to retrieve configuration settings and to update configuration values.
3. Management processors 272 . . . 274, 372 . . . 374 defined and implemented on top of the generic protocol to provide the processing logic of particular management functionality. Each management processor 272 . . . 274, 372 . . . 374 contains a name and a version. In certain embodiments, each management functionality is associated with a particular management processor 272 . . . 274, 372 . . . 374. Furthermore, the management processor 272 . . . 274, 372 . . . 374 implementation understands how to process the messages for that given management processor 272 . . . 274, 372 . . . 374 protocol, and the management processor 272 . . . 274, 372 . . . 374 also knows whether to use synchronous messaging, asynchronous messaging, or a combination of both messaging types.
4. The management processor 272 . . . 274, 372 . . . 374 level negotiation enables support of different levels of management processors 272 . . . 274, 372 . . . 374. In certain embodiments, in an enterprise system, upgrades to new management processors 272 . . . 274, 372 . . . 374 do not impact their ability to function at compatible levels. When a CMX connection 150, 151 is established, a particular management processor 272 . . . 274, 372 . . . 374 level is negotiated prior to actual communication. This negotiation is handled by the core processors 271, 371 of CMX connections 150, 151. A level may also be described as a version.
5. Heterogeneous messaging over a single physical connection is supported such that messages from various agents 130, 132, 290 can be accumulated, combined, and sent on the same physical connection 230. Also, with the heterogeneous messaging over a single physical connection, messages from various services 170, 172, 390 and management processors 372 . . . 374 can be accumulated, combined, and sent on the same physical connection 330.
6. The core processor 271, 371 provides basic functionality for the generic protocol. The core processor 271, 371 provides the level negotiation for the core processor and for the customized management processors 272 . . . 274, 372 . . . 374 of specific management functionality. In addition, the core processor 271, 371 also performs error handling.

FIG. 4 illustrates, in a flow diagram, an overview of how the generic protocol works in accordance with certain embodiments. FIG. 4 is formed by FIGS. 4A, 4B, 4C, 4D, 4E, and 4F. Control begins at block 400 of FIG. 4A with the server computer 160 being started with a management service (e.g., service X 170 or service Y 172). In block 402, the database client 110, 112, 114 asks an agent 130, 132 to establish a client-side CMX connection 150. In block 404, a client-side CMX connection 150 negotiates a base generic protocol level by sending a request with a client-side core processor version of the client-side core processor 271 as an argument using the client-side core processor 271 to the server-side core processor 371. In block 406, the server-side core processor 371 returns the minimum between the actual version of the server-side core processor 371 and the requested version of the client-side core processor 271. In block 408, the agent 130, 132 receives the reply, and the client-side CMX connection 150 is established.

In block 410, the database client 110, 112, 114 wishes to communicate with a management service (e.g., service X 170 or service Y 172). From block 410 of FIG. 4A, processing continues to block 412 of FIG. 4B.

In block 412, the client-side CMX connection 150 negotiates the version of a client-side management processor 272 . . . 274 in the client-side CMX connection 150 and a corresponding server-side management processor 372 . . . 374 in the server-side CMX connection 151, where the management processors 272 . . . 274, 372 . . . 374 correspond to the management service, and where the negotiation includes sending a request with a client-side management processor version as the argument using the client-side core processor 271 to the server-side core processor 371. In block 414, the server-side core processor 371 receives the request and returns the minimum between the actual version of the server-side management processor 372 . . . 374 and the requested version of the client-side management processor 272 . . . 274. In block 416, the client-side CMX connection 150 receives this reply, and the client-side management processor 272 . . . 274 and the server-side management processor 372 . . . 374 are marked as registered on this connection. Any future attempts to use this client-side management processor 272 . . . 274 or this server-side management processor 372 . . . 374 does not need to be re-negotiated.

In block 418, it is determined whether the client-side CMX connection 150 is initiating a message. If so, processing continues to block 420, otherwise, processing continues to block 440. That is, if the server-side CMX connection 151 is initiating a message, processing continues to block 440.

Figure 4A:
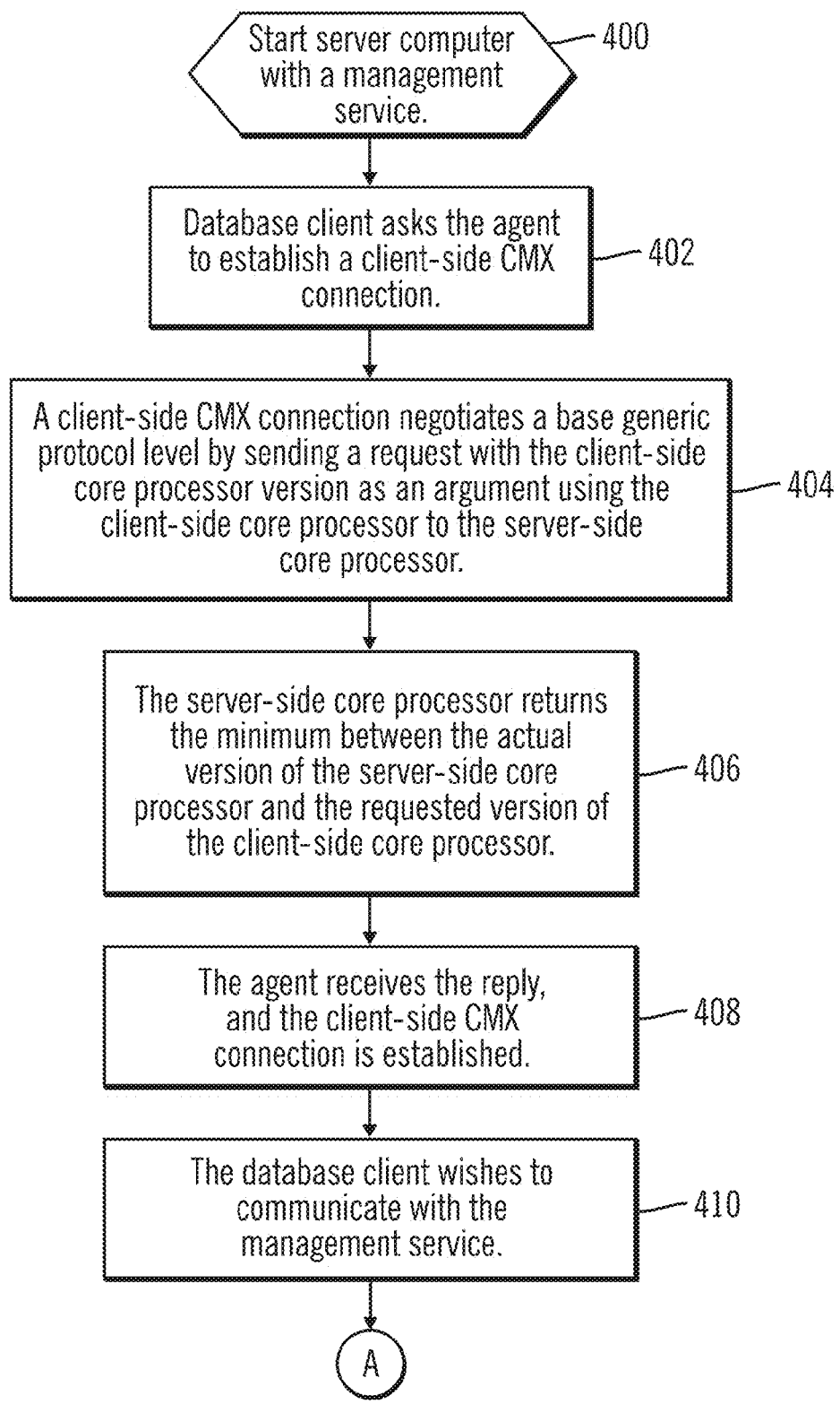
FIG. 4 illustrates, in a flow diagram, an overview of how the generic protocol works in accordance with certain embodiments.
Figure 4B:
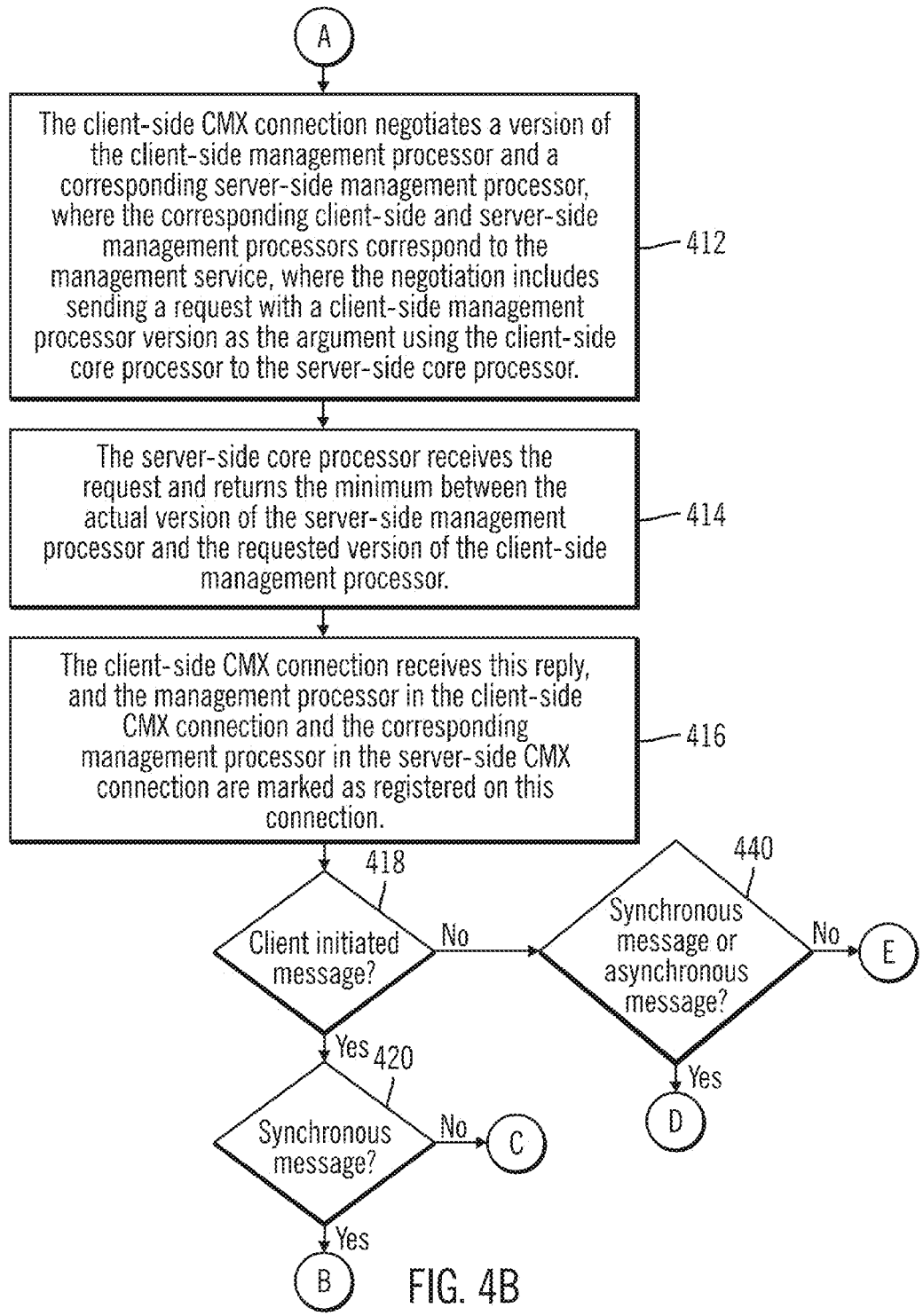

In block 420, it is determined whether the message initiated by the client-side CMX connection 150 is a synchronous message. If so, processing continues to block 422 (FIG. 4C), otherwise, processing continues to block 434 (FIG. 4D). That is, if the message initiated by the client-side CMX connection 150 is an asynchronous message, processing continues to block 434 (FIG. 4D).

Figure 4C:
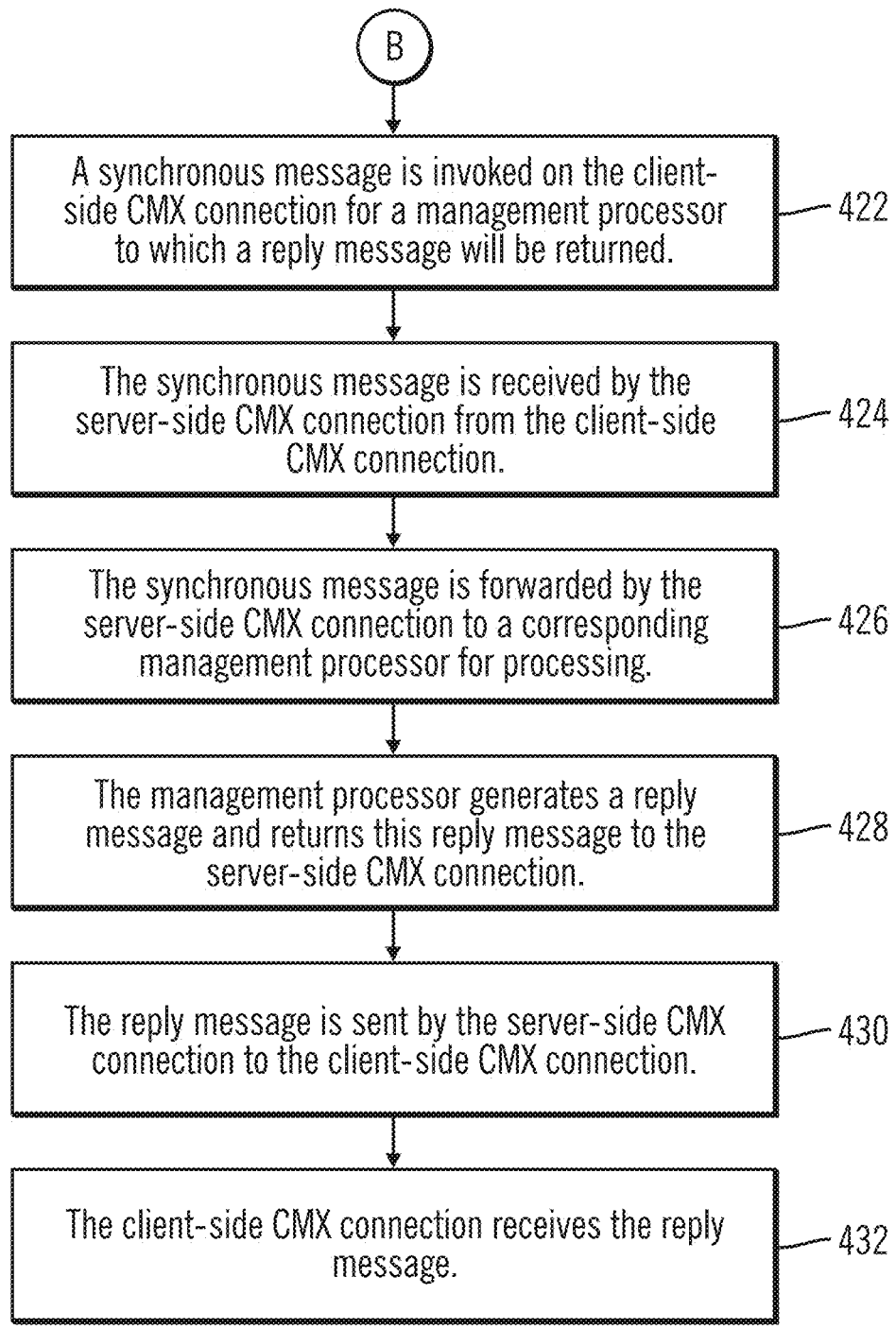
Figure 4D:
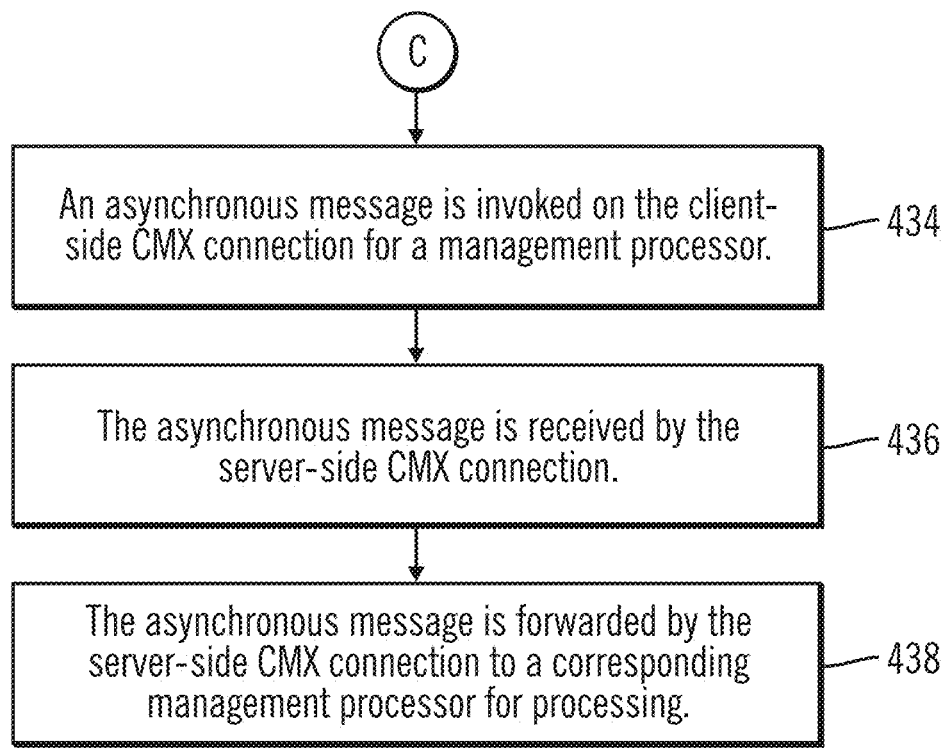

In FIG. 4C, in block 422, a synchronous message is invoked on the client-side CMX connection 150 for a management processor 272 . . . 274 to which a reply message will be returned. In block 424, the synchronous message is received by the server-side CMX connection 151 from the client-side CMX connection 150. In block 426, the synchronous message is forwarded (i.e., passed) by the server-side CMX connection 151 to a corresponding management processor 372 . . . 374 for processing. In block 428, the management processor 372 . . . 374 generates a reply message and returns this reply message to the server-side CMX connection 151. In block 430, the reply message is sent by the server-side CMX connection 151 to the client-side CMX connection 150. In block 432, the client-side CMX connection 150 receives the reply message.

In FIG. 4D, in block 434, an asynchronous message is invoked on the client-side CMX connection 150 for a management processor 272 . . . 274. In block 436, the asynchronous message is received by the server-side CMX connection 151. In block 438, the asynchronous message is forwarded by the server-side CMX connection 151 to a corresponding management processor 372 . . . 374 for processing.

In FIG. 4B, in block 440, it is determined whether the message initiated by the server-side CMX connection 151 is a synchronous message. If so, processing continues to block 442 (FIG. 4E), otherwise, processing continues to block 454 (FIG. 4F). That is, if the message initiated by the server-side CMX connection 151 is an asynchronous message, processing continues to block 454 (FIG. 4F).

Figure 4E:
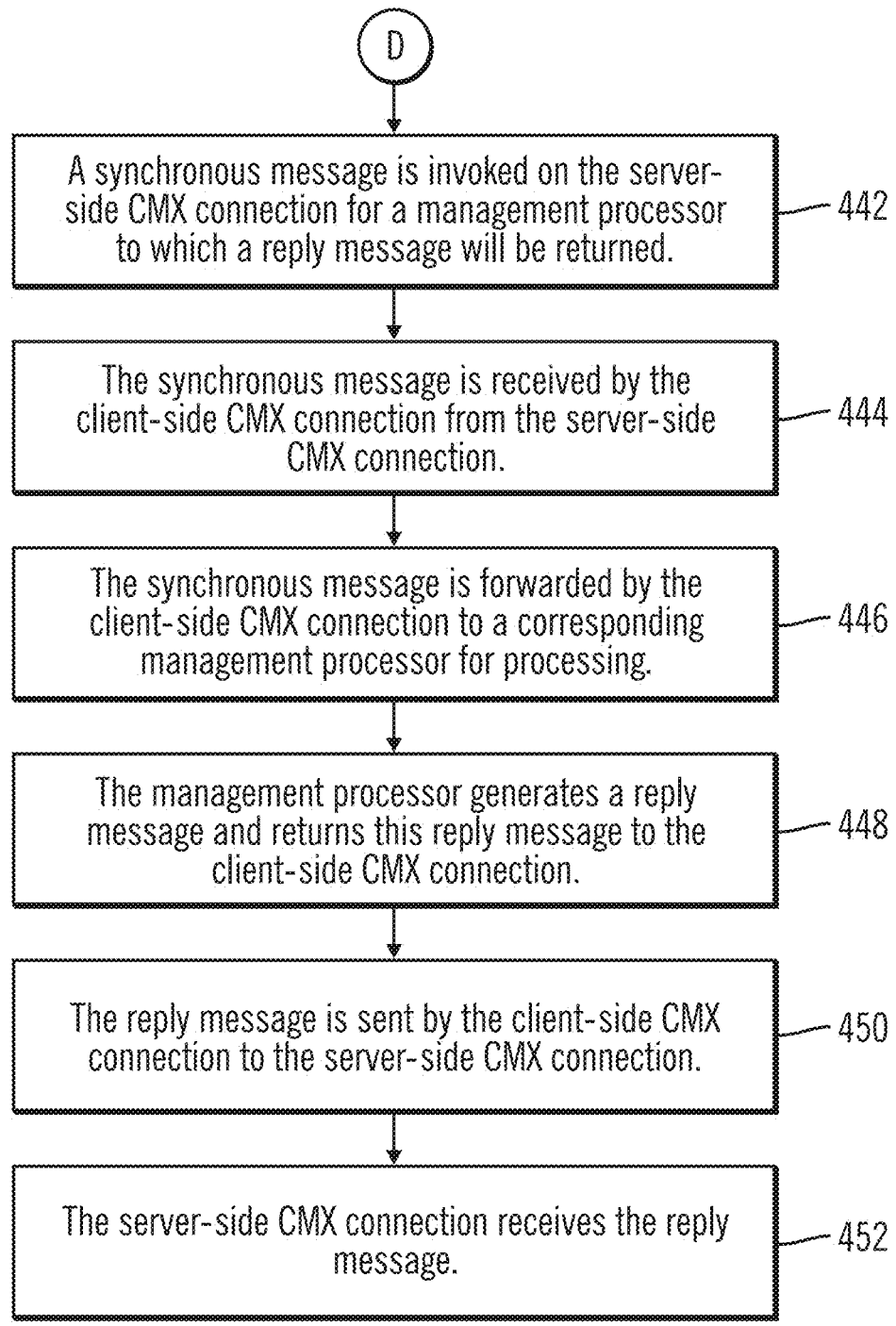
Figure 4F:
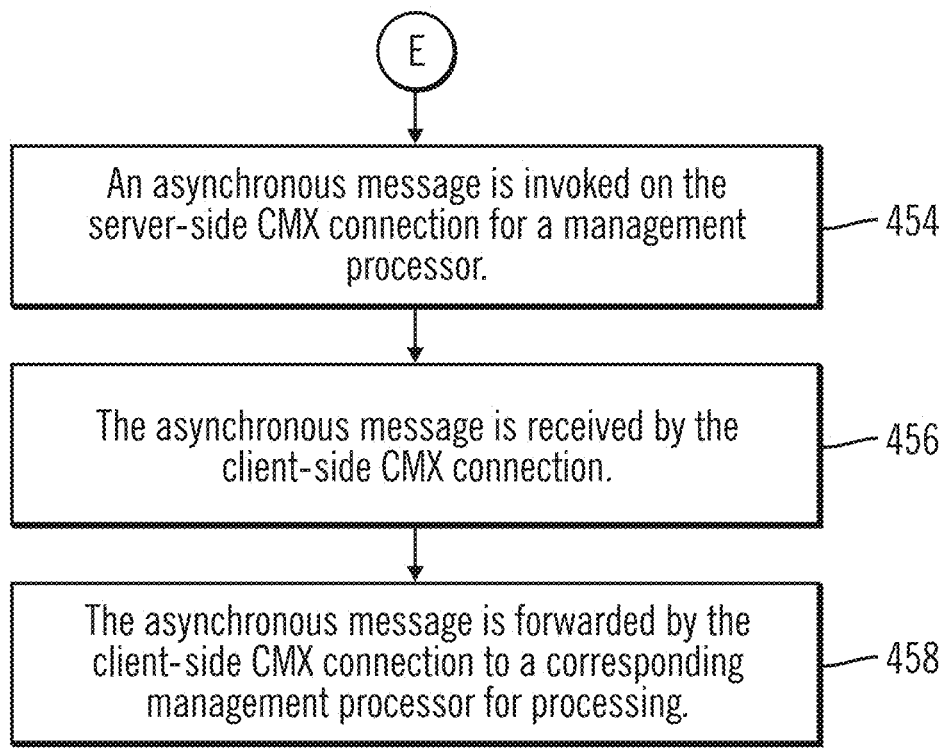
Figure 5A:
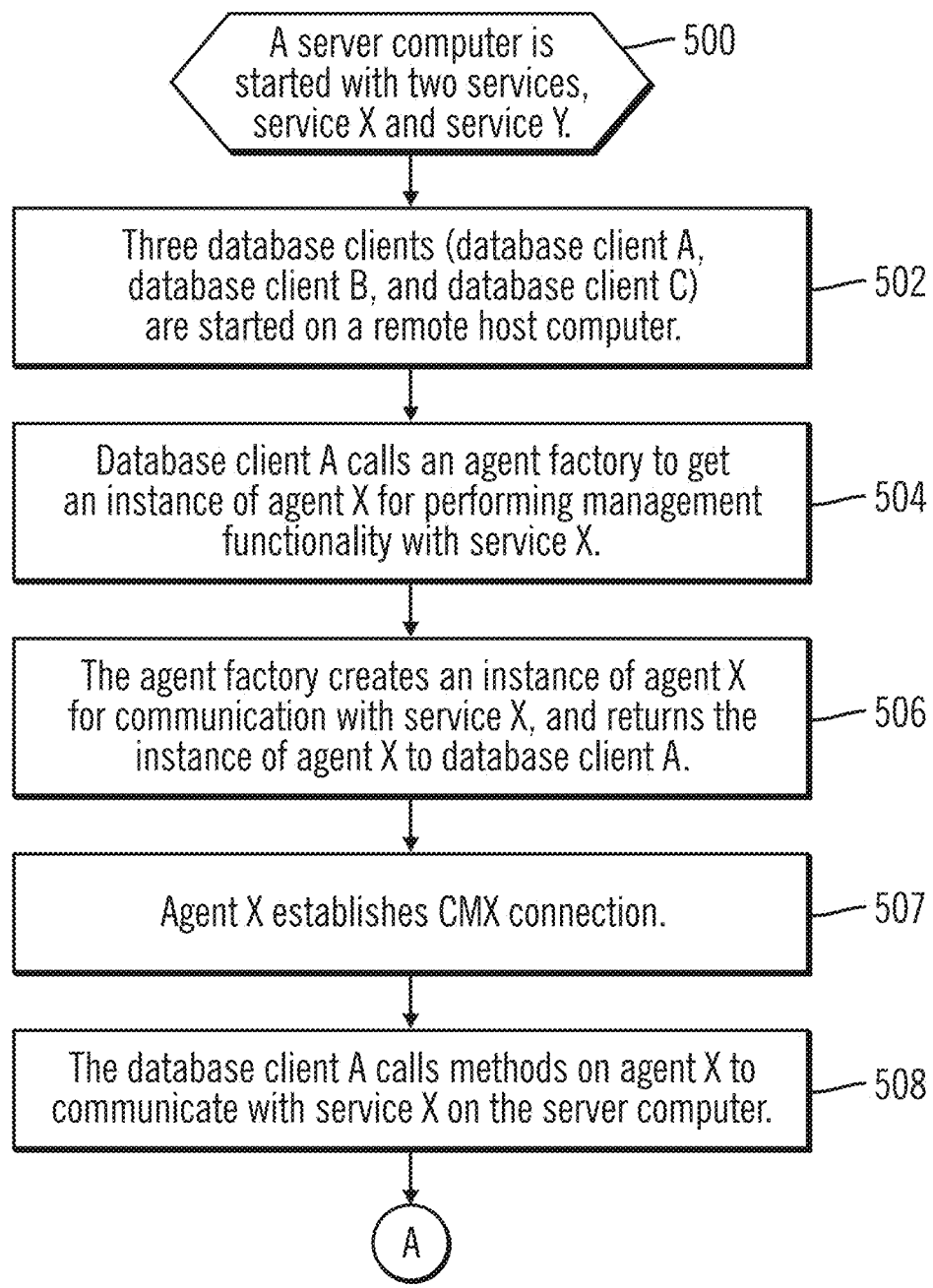
FIG. 5 illustrates, in a flow diagram, an overview of how the optimized call stack works in accordance with certain embodiments.
Figure 5B:
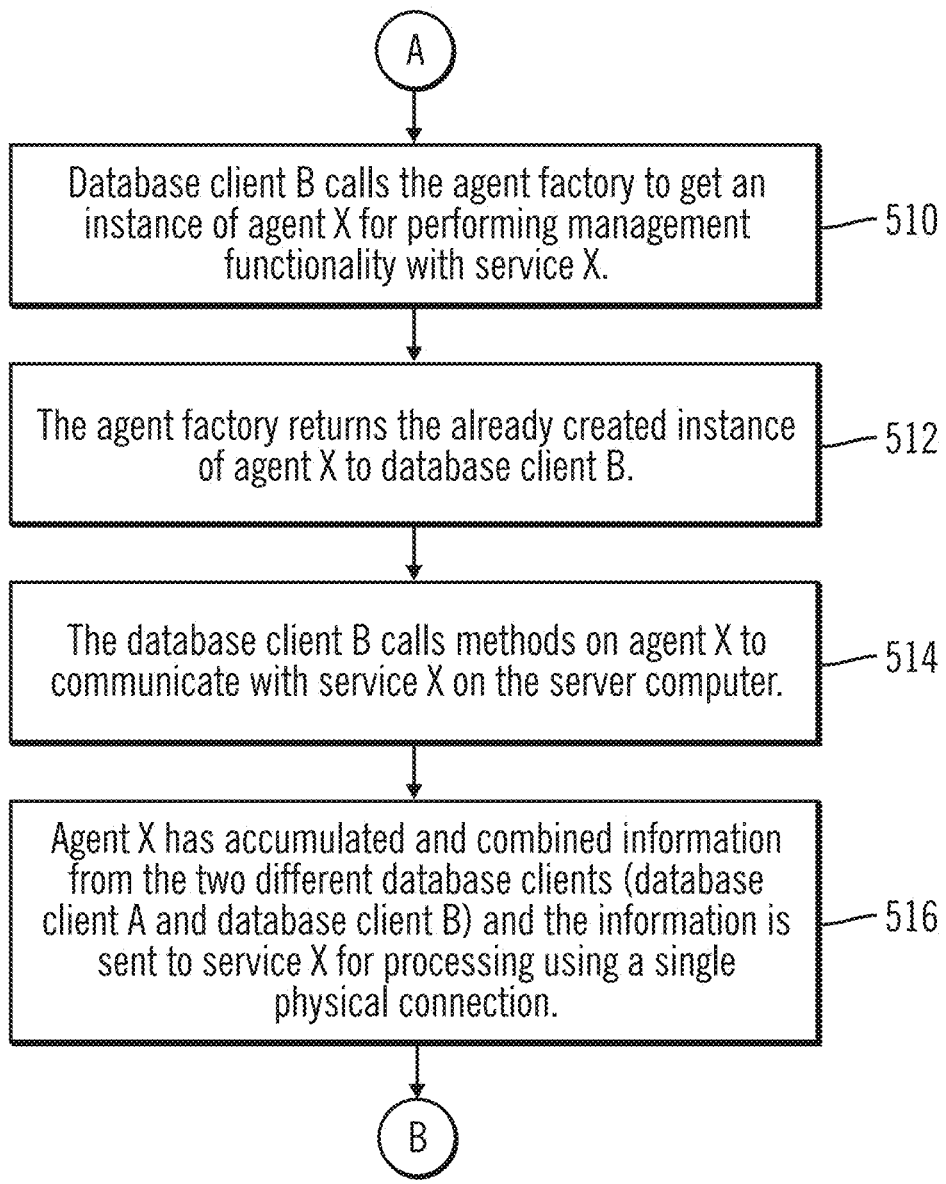
Figure 5C:
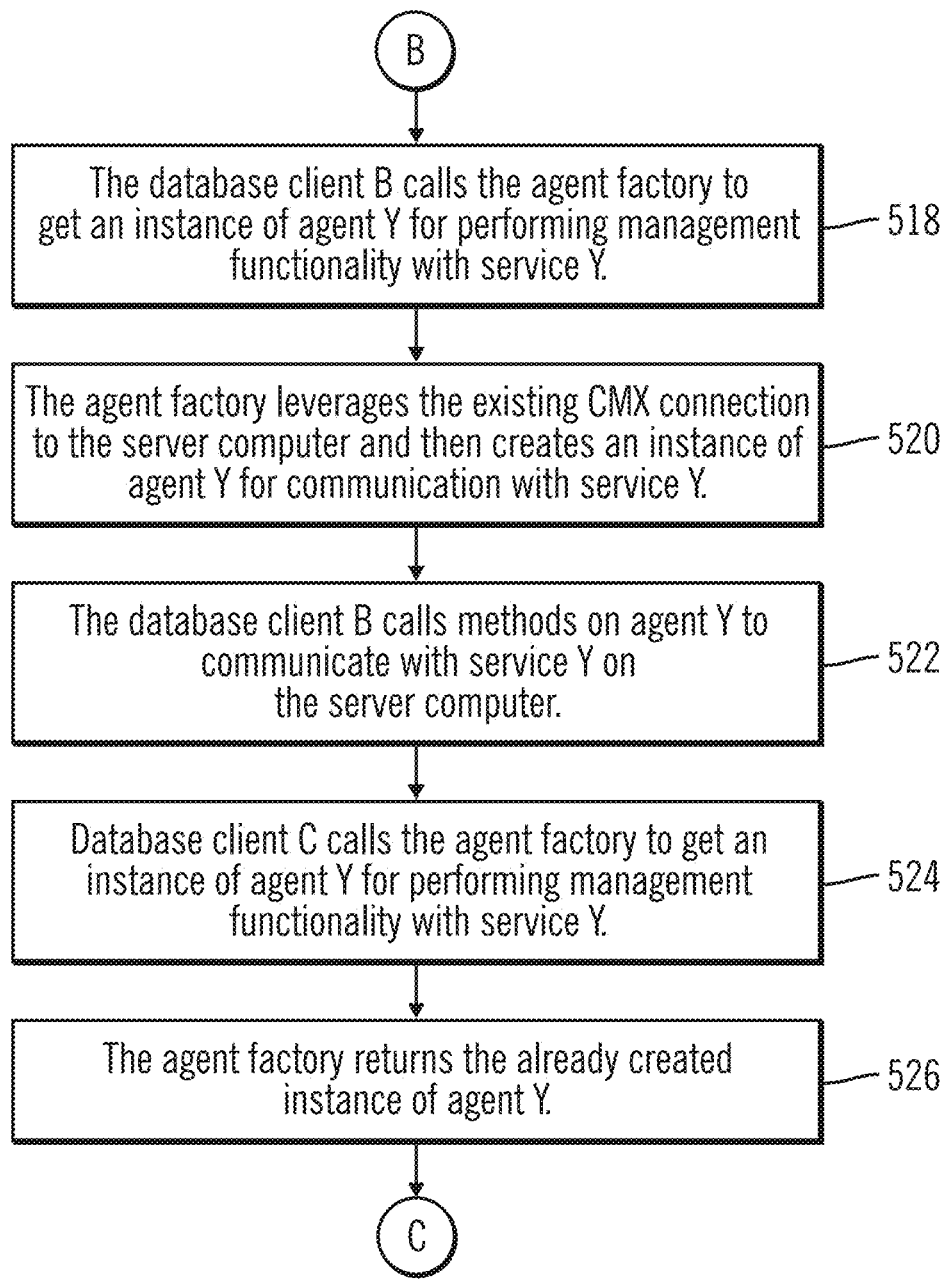
Figure 5D:
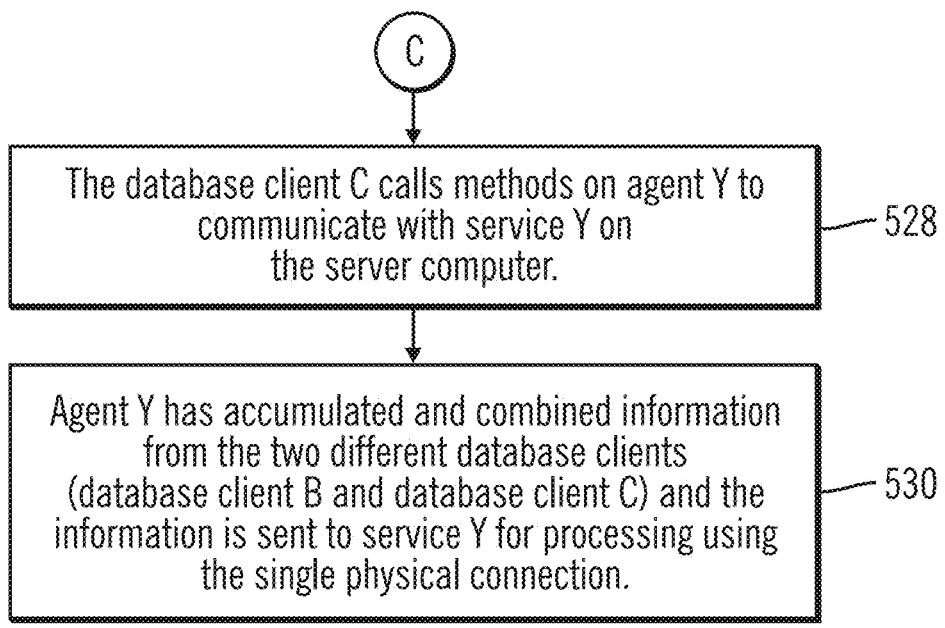

In FIG. 4E, in block 442, a synchronous message is invoked on the server-side CMX connection 151 for a management processor 372 . . . 374 to which a reply message will be returned. In block 444, the synchronous message is received by the client-side CMX connection 150. In block 446, the synchronous message is forwarded by the client-side CMX connection 151 to a corresponding management processor 272 . . . 274 for processing. In block 448, the management processor 272 . . . 274 generates a reply message and returns this reply message to the client-side CMX connection 150. In block 450, the reply message is sent by the client-side CMX connection 150 to the server-side CMX connection 151. In block 452, the server-side CMX connection 151 receives the reply message.

In FIG. 4F, in block 454, an asynchronous message is invoked on the server-side CMX connection 151 for a management processor 372 . . . 374. In block 456, the asynchronous message is received by the client-side CMX connection 150. In block 458, the asynchronous message is forwarded by the client-side CMX connection 150 to a corresponding management processor 272 . . . 274 for processing.

With embodiments, the call stack of hierarchical database clients 110, 112, 114 is enabled with an optimized way of management within enterprise deployments. Traditionally, management of different database clients would be independent of each other. Moreover, any sort of remote management would mean that each database client has its own channel. In certain embodiments, the call stack in the architecture is optimized such that the call stack allows the client layers to share the same physical socket (e.g., physical connection 230). In addition, the information across different client layers can be combined to provide a complete picture on the overall system and can also be accumulated to optimize management data flows.

FIG. 5 illustrates, in a block diagram, an overview of how the optimized call stack works in accordance with certain embodiments. FIG. 5 is formed by FIGS. 5A, 5B, 5C, and 5D. Control begins at block 500 with the server computer 160 being started with two services, service X 170 and service Y 172. In block 502, three database clients (database client A 110, database client B 112, and database client C 114) are started on a remote client computer 100. In block 504, the database client A calls an agent factory 120 to get an instance of agent X 130 for performing management functionality with service X 170.

In block 506, the agent factory 120 creates an instance of agent X 130 for communication with service X 170, and returns the instance of agent X 130 to the database client A 110. In block 507, the instance of agent X 130 creates a CMX connection, which in turn creates a physical connection. In block 508, the database client A 110 calls methods on agent X 130 to communicate with service X 170 on the server computer 160.

In block 510, database client B 112 calls the agent factory 120 to get an instance of agent X 130 for performing management functionality with service X 170. In block 512, the agent factory 120 returns the already created instance of agent X 130 to the database client B 112. In block 514, the database client B 112 calls methods on agent X 130 to communicate with service X 170 on the server computer 160.

In block 516, agent X 130 has accumulated and combined information from the two different database clients (database client A 110 and database client B 112) and the information is sent to service X 170 for processing using a single physical connection. Thus, the database clients share agent X 130 and share a single physical connection.

In block 518, the database client B 112 calls the agent factory 120 to get an instance of agent Y 132 for performing management functionality with service Y 172. In block 520, the agent factory 120 leverages the existing CMX connection 150 to the server computer 160 and then creates an instance of agent Y 132 for communication with service Y 172. In block 522, the database client B 112 calls methods on agent Y 132 to communicate with service Y 172 on the server computer 160.

In block 524, database client C 114 calls the agent factory 120 to get an instance of agent Y 132 for performing management functionality with service Y 172. In block 526, the agent factory 120 returns the already created instance of agent Y 132. In block 528, the database client C 114 calls methods on agent Y 132 to communicate with service Y 172 on the server computer 160. In block 530, agent Y 172 has accumulated and combined information from the two different database clients (database client B 112 and database client C 114) and the information is sent to service Y 172 using a single physical connection for processing.

In addition to the scenarios described with reference to FIG. 5, agents 130, 132 can establish connections to multiple other server computers, and similarly the connections can also be shared across agents. Moreover, each agent in this infrastructure can define customized send/receive semantics and asynchronous messaging. This enables hierarchical information to be combined such that a more complete picture of the system can be provided. This also allows accumulation of distinct information to optimize message flows.

Thus, embodiments provide a universal architecture for client management extensions on monitoring, control, and configuration of database environments. The universal architecture provides a polymorphic infrastructure, a generic protocol, and an optimized call stack.

With embodiments, the same physical connection can be reused my many CMX connections 150, 151 if one already exists. With embodiments, a CMX connection 150, 151 can be reused by agents 130, 132 if a CMX connection 150, 151 is already established for the server computer 160. With embodiments, an agent 130, 132 can be reused by database clients 110, 112, 114 if the agent 130, 132 has already been instantiated for a particular service 170, 172.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction processing (i.e., running) system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction processing system for running or executing instructions, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 6:
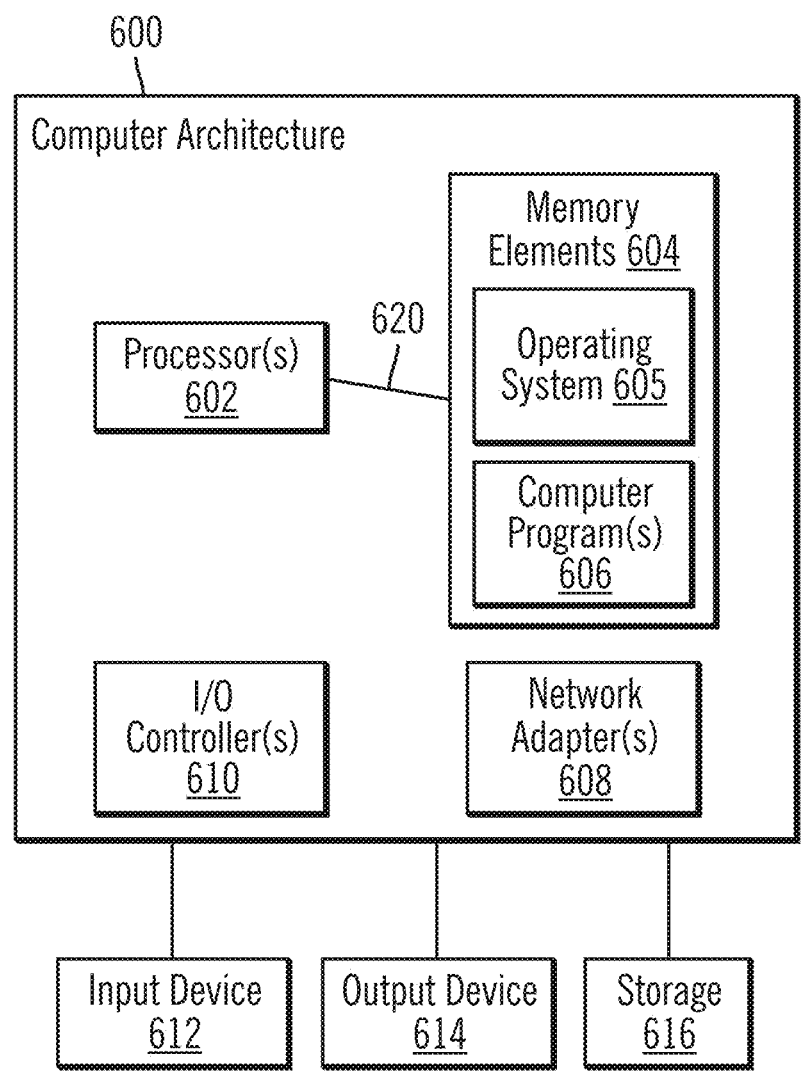
FIG. 6 illustrates a system architecture that may be used in accordance with certain embodiments.

FIG. 6 illustrates a system architecture 600 that may be used in accordance with certain embodiments. The client computer 100 and/or the server computer 160 may implement system architecture 600. The system architecture 600 is suitable for storing and/or running program code and includes at least one processor 602 coupled directly or indirectly to memory elements 604 through a system bus 620. The memory elements 604 may include local memory employed during actual running of the program code, bulk storage, and cache memories which provide temporary storage of at least some program code in order to reduce the number of times code must be retrieved from bulk storage during run time. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and run by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
using, by a client computer that includes a processor, a client-side Client Management Extension (CMX) connection coupled to the client computer to send messages, wherein the client-side CMX connection includes a client-side message queue, a client-side core processor, one or more client-side management processors, a client-side outgoing message reader thread, and a client-side incoming message reader thread, and wherein the client computer includes an agent and includes a first database client and a second database client that share the agent;
using a server-side CMX connection to receive messages, wherein the server-side CMX connection includes a server-side message queue, a server-side core processor, one or more server-side management processors, a server-side outgoing message reader thread, and a server-side incoming message reader thread; and
under control of the agent:
receiving a request from the first database client to access a service from a set of services, wherein the agent is associated with the service;
receiving a request from the second database client to access the service;
combining information from the first database client and the second database client; and
sending the combined information as a message to the service using a single physical connection in the client-side CMX connection, wherein the first database client and the second database client share the single physical connection; and
receiving a message from another service from the set of services through the server-side CMX connection.

2. The method of claim 1, further comprising:
under control of the client-side CMX connection:
using a generic protocol that is used for multiple management functionalities for communication with the server-side CMX connection.

3. The method of claim 2, wherein the management functionalities include monitoring, control, and configuration functionalities.

4. The method of claim 2, further comprising:
under control of the client-side CMX connection,
negotiating a version of a client-side management processor and a corresponding server-side management processor, wherein the client-side management processor and the server-side management processor correspond to the service, and wherein the negotiation includes sending a request with a client-side management processor version as an argument using the client-side core processor to the sever-side CMX connection; and
receiving from the server-side CMX connection a minimum between an actual version of the server-side management processor and the requested version of the client-side management processor, wherein the client-side management processor and the server-side management processor are marked as registered.

5. The method of claim 2, further comprising:
under control of the server-side CMX connection,
in response to receiving a synchronous message from the client-side CMX connection,
forwarding the synchronous message to a server-side management processor of the server-side CMX connection, wherein the server-side management processor generates a reply; and
returning the reply to the client-side CMX connection; and
in response to receiving an asynchronous message from the client-side CMX connection, forwarding the synchronous message to the server-side management processor of the server-side CMX connection.

6. The method of claim 2, further comprising:
under control of the client-side CMX connection,
in response to receiving a synchronous message from the server-side CMX connection:
forwarding the synchronous message to a the client-side management processor of the client-side CMX connection, wherein the client-side management processor generates a reply; and
returning the reply to the server-side CMX connection; and
in response to receiving an asynchronous message from the server-side CMX connection, forwarding the asynchronous message to the client-side management processor of the client-side CMX connection.

7. The method of claim 2, wherein the client-side message queue accumulates and combines information from multiple agents.

8. The method of claim 1, wherein the agent accumulates and combines information from multiple agents.

9. A computer program product comprising a non-transitory computer readable storage medium storing computer readable program code that, when run on a processor of a client computer, causes the computer to:
use a client-side Client Management Extension (CMX) connection coupled to the client computer to send messages, wherein the client-side CMX connection includes a client-side message queue, a client-side core processor, one or more client-side management processors, a client-side outgoing message reader thread, and a client-side incoming message reader thread, and wherein the client computer includes an agent and includes a first database client and a second database client that share the agent;

use a server-side CMX connection to receive messages, wherein the server-side CMX connection includes a server-side message queue, a server-side core processor, one or more server-side management processors, a server-side outgoing message reader thread, and a server-side incoming message reader thread; and under control of the agent:
receive a request from the first database client to access a service from a set of services, wherein the agent is associated with the service;
receive a request from the second database client to access the service;
combine information from the first database client and the second database client; and
send the combined information as a message to the service using a single physical connection in the client-side CMX connection, wherein the first database client and the second database client share the single physical connection; and
receive a message from another service from the set of services through the server-side CMX connection.

10. The computer program product of claim 9, wherein the computer readable program code, when run on the processor, causes the computer to:
under control of the client-side CMX connection:
use a generic protocol that is used for multiple management functionalities for communication with the server-side CMX connection.

11. The computer program product of claim 10, wherein the management functionalities include monitoring, control, and configuration functionalities.

12. The computer program product of claim 10, wherein the computer readable program code, when run on the processor, causes the computer to:
under control of the client-side CMX connection,
negotiate a version of a client-side management processor and a corresponding server-side management processor, wherein the client-side management processor and the server-side management processor correspond to the service, and wherein the negotiation includes sending a request with a client-side management processor version as an argument using the client-side core processor to the sever-side CMX connection; and
receive from the server-side CMX connection a minimum between an actual version of the server-side management processor and the requested version of the client-side management processor, wherein the client-side management processor and the server-side management processor are marked as registered.

13. The computer program product of claim 10, wherein the computer readable program code, when run on the processor, causes the computer to:
under control of the server-side CMX connection,
in response to receiving a synchronous message from the client-side CMX connection,
forward the synchronous message to a server-side management processor of the server-side CMX connection, wherein the server-side management processor generates a reply; and
return the reply to the client-side CMX connection; and
in response to receiving an asynchronous message from the client-side CMX connection, forward the synchronous message to the server-side management processor of the server-side CMX connection.

14. The computer program product of claim 10, wherein the computer readable program code, when run on the processor, causes the computer to:
under control of the client-side CMX connection,
in response to receiving a synchronous message from the server-side CMX connection:
forward the synchronous message to a client-side management processor of the client-side CMX connection, wherein the client-side management processor generates a reply; and
return the reply to the server-side CMX connection; and
in response to receiving an asynchronous message from the server-side CMX connection, forward the asynchronous message to the client-side management processor of the client-side CMX connection.

15. The computer program product of claim 10, wherein the client-side message queue accumulates and combines information from multiple agents.

16. The computer program product of claim 9, wherein the agent accumulates and combines information from multiple agents.

17. A client computer, comprising:
a processor; and
storage coupled to the processor, wherein the storage stores a computer program, and wherein the computer program is executable by the processor to perform operations, the operations comprising:
using a client-side Client Management Extension (CMX) connection coupled to the client computer to send messages, wherein the client-side CMX connection includes a client-side message queue, a client-side core processor, one or more client-side management processors, a client-side outgoing message reader thread, and a client-side incoming message reader thread, and wherein the client computer includes an agent and includes a first database client and a second database client that share the agent;
using a server-side CMX connection to receive messages, wherein the server-side CMX connection includes a server-side message queue, a server-side core processor, one or more server-side management processors, a server-side outgoing message reader thread, and a server-side incoming message reader thread; and
under control of the agent:
receiving a request from the first database client to access a service from a set of services, wherein the agent is associated with the service;
receiving a request from the second database client to access the service;
combining information from the first database client and the second database client; and
sending the combined information as a message to the service using a single physical connection in a client-side CMX connection, wherein the first database client and the second database client share the single physical connection; and
receiving a message from another service from the set of services through the server-side CMX connection.

18. The client computer of claim 17, wherein the operations further comprise:
under control of the client-side CMX connection:
using a generic protocol that is used for multiple management functionalities for communication with the server-side CMX connection.

19. The client computer of claim 18, wherein the management functionalities include monitoring, control, and configuration functionalities.

20. The client computer of claim 18, wherein the operations further comprise:
under control of the client-side CMX connection,
negotiating a version of a client-side management processor and a corresponding server-side management processor, wherein the client-side management processor and the server-side management processor correspond to the service, and wherein the negotiation includes sending a request with a client-side management processor version as an argument using the client-side core processor to the sever-side CMX connection; and
receiving from the server-side CMX connection a minimum between an actual version of the server-side management processor and the requested version of the client-side management processor, wherein the client-side management processor and the server-side management processor are marked as registered.

21. The client computer of claim 18, wherein the operations further comprise:
under control of the server-side CMX connection,
in response to receiving a synchronous message from the client-side CMX connection,
forwarding the synchronous message to a server-side management processor of the server-side CMX connection, wherein the server-side management processor generates a reply; and
returning the reply to the client-side CMX connection; and
in response to receiving an asynchronous message from the client-side CMX connection, forwarding the synchronous message to the server-side management processor of the server-side CMX connection.

22. The client computer of claim 18, wherein the operations further comprise:
under control of the client-side CMX connection,
in response to receiving a synchronous message from the server-side CMX connection:
forwarding the synchronous message to a client-side management processor of the client-side CMX connection, wherein the client-side management processor generates a reply; and
returning the reply to the server-side CMX connection; and
in response to receiving an asynchronous message from the server-side CMX connection, forwarding the asynchronous message to the client-side management processor of the client-side CMX connection.

23. The client computer of claim 18, wherein the client-side message queue accumulates and combines information from multiple agents.

24. The client computer of claim 17, wherein the agent accumulates and combines information from multiple agents.

25. A system comprising:
a connection that includes:
a client-side Client Management Extension (CMX) connection, wherein the client-side CMX connection includes a client-side message queue, a client-side core processor, client-side management processors, a client-side outgoing message reader thread, and a client-side incoming message reader thread, wherein the client-side CMX connection is coupled to a client computer with database clients and agents, and wherein the database clients share the agents;
a server-side CMX connection coupled to the client-side CMX connection, wherein the server-side CMX connection includes a server-side message queue, a server-side core processor, server-side management processors, a server-side outgoing message reader thread, and a server-side incoming message reader thread, and wherein the server-side CMX connection is coupled to a server computer that provides a set of services; and
wherein the client-side CMX connection and the server-side CMX connection communicate with each other using a generic protocol that is used for multiple management functionalities.

* * * * *